C. A. WEED.
GRAIN-SEPARATOR
No. 190,990.                 Patented May 22, 1877.
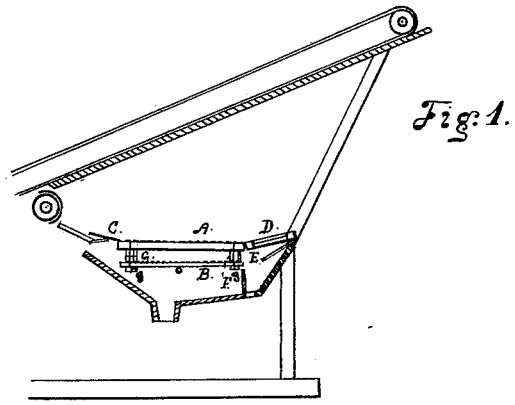
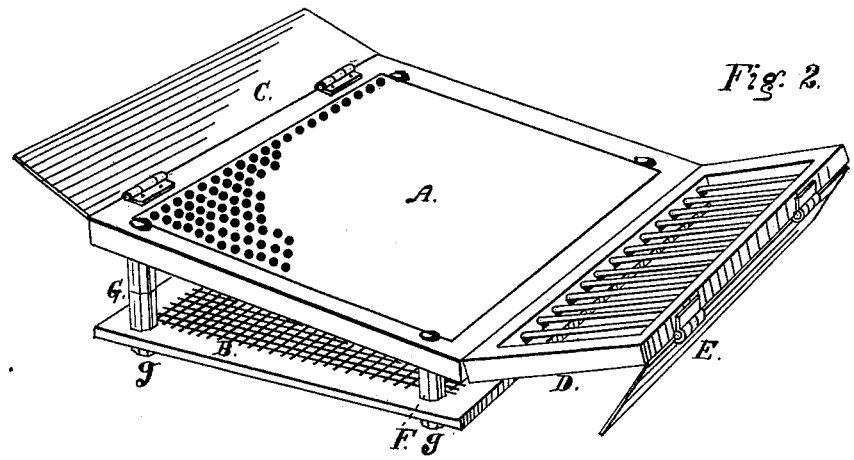
WITNESSES:
S. G. King
Chas. Finck
INVENTOR:
Clinton A. Weed
By H. B. Smith
Atty in fact

UNITED STATES PATENT OFFICE.

CLINTON A. WEED, OF RACINE, WISCONSIN, ASSIGNOR TO J. I. CASE & CO., OF SAME PLACE.

IMPROVEMENT IN GRAIN-SEPARATORS.

Specification forming part of Letters Patent No. 190,990, dated May 22, 1877; application filed June 24, 1876.

*To all whom it may concern:*

Be it known that I, CLINTON A. WEED, of Racine, in the county of Racine, in the State of Wisconsin, have invented certain Improvements in Timothy and Flax Seed Sieves, of which the following is a specification:

My invention has for its object to provide an improved means for the sifting of timothy-seed or flax-seed. The chaff and other impurities fall through the meshes of the sieve. The device is mounted in a shoe attached to a thrashing-machine, and a front flap is hinged to it, and arranged so that the seed shall fall onto the same and slide down it onto the screen, and the chaff passes over the screen to the tail thereof, and through a set of rods forming a grating hinged to the back part of same, and be slid into the tailings-trough of the shoe over a slide-board hinged to the rear edge of the tailings-grating, while the seed pass through the screen and fall on a finer sieve below.

Referring to the drawing forming part of this specification, Figure 1 is a side view of the shoe of a thrasher embodying my invention, and Fig. 2 a perspective view of the same.

A is a zinc screen; B, a finer sieve attached under the same; C, a feed-board, of iron or other material, hinged to the front edge of screen A, to conduct the seed onto the same; D, a hinged frame, with rods through same forming a rake or grating, which is hinged to screen A at the rear edge of the same, through which grating the tailings and other coarse stuff fall; E, a plain chute or slide hinged to the lower edge of frame D, and turned under for the purpose of sliding the coarse stuff falling through the grate into the tailings-trough of the machine; F, a pair of studs between screen A and sieve B, with bolts passing through same and secured below by a removable nut, $g$, to keep the screen and sieve rigidly apart; G, a pair of tubular studs with bolt passing through same, and secured below by a removable nut, $g$, which keep the other end of the screen and sieve apart.

The sieve may be changed and a coarser or finer one put in its place, and one of the studs G may be taken out at each side and the sieve set parallel with the screen, if thought best, or if necessary.

The manifold adjustments of which my separating attachment is capable, from the parts being all hinged together, are its principal advantages. The inclination of the feed-board, of the sieve, and of the tailings-rake, with its chute or slide-board, may be varied to suit the exact requirements of the different circumstances, the nature or condition of the material, or the strength of the fan-blast, when such is used. The attachment may simply be placed in the shoe adapted to fit it, and the parts either adjusted by hand or set by any suitable means of adjustment.

I claim as new and as my invention—

The within-described device for separating grain, seed, &c., consisting of the feed-board, the sieve, the tailings-grate, and the tailings-chute, all hinged together in the order named, substantially as set forth.

CLINTON A. WEED.

Witnesses:
  J. B. SMITH,
  JOHN A. FIELD.